Patented July 22, 1941

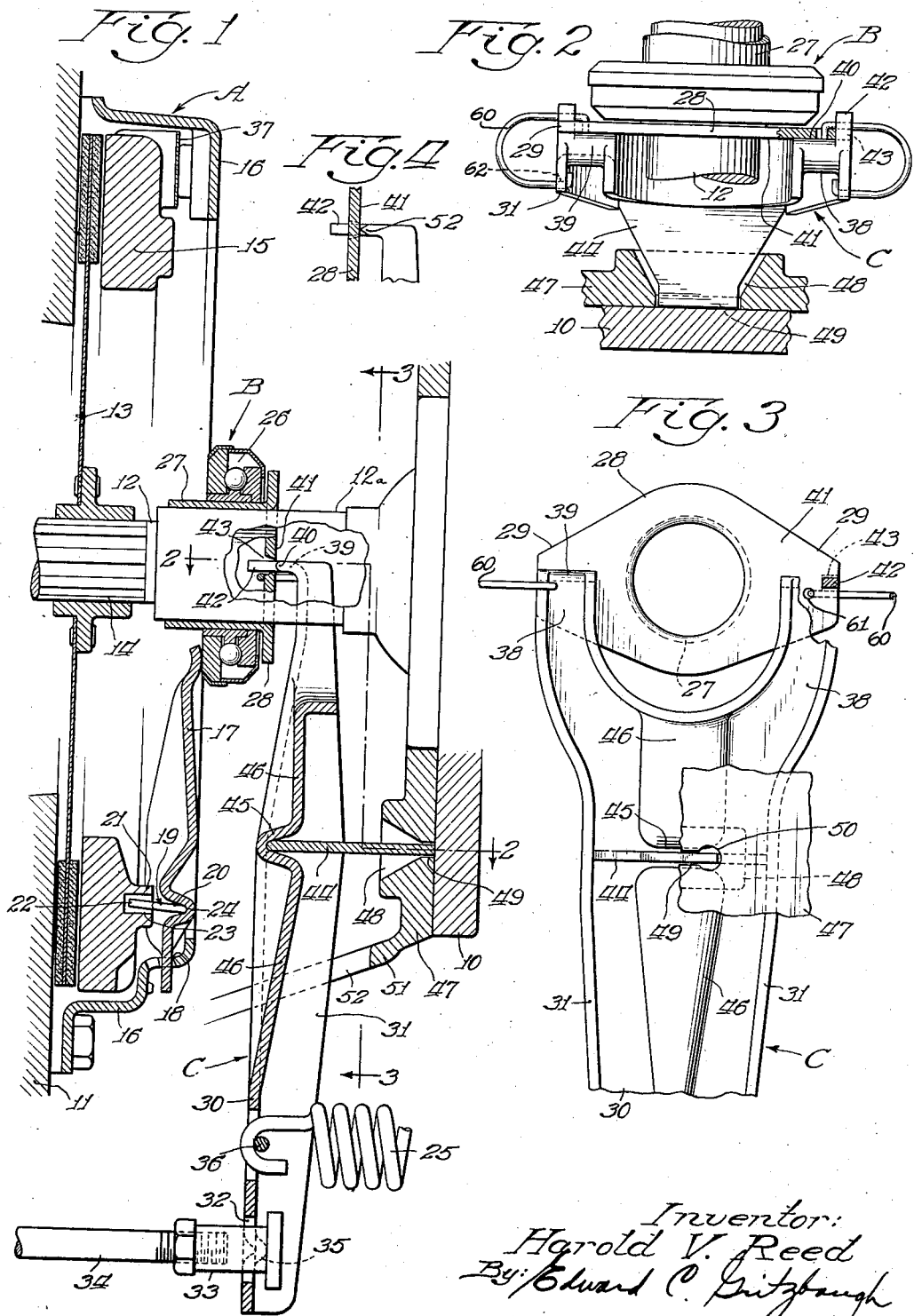

2,250,394

UNITED STATES PATENT OFFICE 2,250,394

FRICTION CLUTCH

Harold V. Reed, Chicago, Ill., assignor to Borg Warner Corporation, Chicago, Ill., a corporation of Illinois Application October 11, 1939, Serial No. 298,869

7 Claims. (Cl. 192—99)

This invention relates to driving mechanisms of the friction clutch type, and has as its object to provide an improved friction clutching mechanism including a friction clutch, means remote from the clutch per se for providing pressure for the engagement of the clutch, and operating linkage for transferring the pressure from said means to the clutch.

More specifically, the invention contemplates an arrangement wherein pressure is transmitted from a remote spring to a thrust collar (from which it is distributed to the several engagement levers of the clutch) through the medium of an operating lever having a novel and improved fulcruming association with a portion of the frame of the vehicle in which the clutching mechanism is incorporated, and having one end in thrust transmitting association with the collar, the lever fulcrum being shiftable so as to allow the axis of association with the collar to remain fixed.

Another object of the invention is to provide, in a clutch organization of the type specified, an operating lever arranged to develop a minimum of resistance to its swinging movement as it transfers pressure from a remote source to the thrust transmitting collar.

Another object of the invention is to provide in a clutch organization of the type specified, an arrangement including an operating lever having semi-cylindrical end edges adapted to maintain a substantially rolling contact with a radial face of the thrust transmitting collar.

Another object of the invention is to provide a novel and improved arrangement whereby the operating lever and thrust transmitting collar are yieldingly maintained in constant engagement with each other on an axis that is fixed with respect to the thrust collar.

Other objects, the advantages and uses of the invention will become more apparent after reading the following specification and claims and after consideration of the drawing forming a part of the specification, wherein:

Fig. 1 is an axial sectional view of a friction clutch organization involving the invention;

Fig. 2 is a plan view of the same, partly in section taken as indicated by the line 2—2 of Fig. 1;

Fig. 3 is a vertical sectional view of the same taken as indicated by the line 3—3 of Fig. 1.

Fig. 4 is a detail sectional view of a modified form of the invention.

As an illustration of one form in which the invention may be embodied, I have shown in the drawing a portion of the drive mechanism of an automotive vehicle including a frame part 10, a driving member 11, which may comprise a fly wheel of the vehicle engine, and a driven member 12 designed to be selectively coupled to or uncoupled from the driving member 11.

The invention provides a friction clutch unit embodying a driven plate 13 splined as at 14 to the driven shaft 12, a pressure plate 15 adapted to engage the driven plate 13 against the fly wheel 11, a cover 16 attached to the fly wheel 11 and partially enclosing the pressure plate 15 and driven plate 13, and engagement levers 17 fulcrumed at 18 in the cover 16 and adapted to transmit thrust, through the medium of struts 19, to the pressure plate 15.

The struts 19 are T-shaped, each including a head portion 20 seated in a depression 24 in a corresponding lever 17, abuttingly engaged between said depression 24 and a boss 21 on the pressure plate 15, and including a tail portion 22 piloted in an opening 23 in the boss 21. In the disengaged position of the parts, the struts 19 are tilted somewhat with their head portions 20 inclined radially outwardly, so that, as the levers swing about the fulcrums 18, and the depressions 24 assume positions more nearly in line radially with the fulcrums 18, the head portions of the struts may swing radially inwardly to conform to the radially inward movement of the depression 24, thus avoiding binding of the tail portion 22 in the opening 23.

The clutch unit A does not in itself include any resilient means for effecting clutch engagement. Pressure for clutch engagement comes from a coil spring 25 which is entirely outside of the clutch unit A. Such pressure is transmitted to the inner ends of the levers 17 by a thrust bearing or collar B, and from the spring 25 to the collar B the pressure is transmitted through the medium of an operating lever C.

The collar B includes a bearing portion 26 and a sleeve 27 extending through the bearing portion 26 and slidable on a frame-mounted sleeve 12a through which the shaft 12 extends. The rear end of the sleeve 27 is formed with a radially outwardly extending flange 28 which is extended at diametrically opposite points to form ears 29 projecting beyond the periphery of the bearing portion 26.

The operating lever C is formed of stamped sheet metal for maximum strength combined with lightness and low expense and includes, in general, a web portion 30 and side flanges 31. At one end, it is formed with an opening 32 through which projects the adjustable head 33 of a pull rod 34. The head 33 is engaged against fulcrum projections 35 formed in the web 30 on either side of the opening 32. The spring 25 is hooked around a pin 36 mounted in the side flanges 31.

The pull rod 34 extends in the opposite direction from the spring 25, and is adapted to be connected to a foot pedal by means of which the load of the spring 25 may be taken from the lever C, thus allowing the clutch to become released under the pull of retractor springs 37 which may be of the type comprising bars for drivingly connecting the pressure plate 15 to the cover 16.

At its opposite end, the lever C is formed with a fork adapted to engage the thrust collar B. The fork comprises furcations 38 embracing the driven shaft 12. The furcations 38 of the fork have their end regions bent as at 39 substantially at right angles to the longitudinal axis of the lever. The end regions 39 terminate in semi-cylindrical edges 40 which are in abutting engagement with the radial face 41 of the flange 28. The outer side regions of the end portions 39 are extended to form fingers 42 which project through notches 43 in the extremities of the ears 29. The notches 43 are flared as shown so as to allow the fingers 42 to tilt without binding.

The engagement of the fingers 42 in the notches 43 constrains the edges 40 of the furcations 38 to remain in contact with the abutment face 41 on an axis which is fixed with relation to the thrust collar B to the extent that there can be no radial sliding movement of the edges 40 with respect to the abutment face 41. The only movement of the edges 40 with respect to the abutment face 41 will be a slight rolling movement, which is practically frictionless. In order that this rolling movement may not shift the line of contact of the edges 40 with the abutment face 41 to any appreciable extent, the semi-cylindrical faces of the edges 40 are curved on a small diameter, which may be substantially the same as the thickness of the sheet metal of which the lever C is composed.

In order to allow the axis of contact with the thrust collar B to remain fixed, and at the same time allow free fulcruming movement of the lever, the lever is provided with a floating fulcrum. To this end, there is provided a fulcrum strut 44 having squared ends one of which is received in a depression 45 formed between a pair of reenforcing ribs 46 extending centrally of the web 30, and is abutted against the web 30 and the other of which is abutted against the frame part 10. A bracket 47, secured to the frame part 10, provides a socket 48 in which the strut 44 is piloted. The socket 48 is frusto-pyramidal in shape, terminating at its apex in a narrow slot 49 the ends of which are enlarged as at 50 in order that the engagement of the struts in the slot may be confined to the central region thereof. The bracket 47 includes an extension 51 having a slot 52 through which the lever C extends.

The end edges 40 of the furcations 38 are maintained constantly in contact with the bearing surface 41 by spring clips 60 yieldably embracing the adjacent regions of the furcations and the ears 29 between them. The spring clips may be maintained against dislodgment by having their ends hooked into openings 61 in the ears 29 and into notches 62 in the furcations 38 as shown.

The lever is supported by the engagement of the fingers 42 in the notches 43, the engagement of the lever against the strut 44, and the engagement of the strut 44 in the socket 48, under the pull of the spring 25.

The surface 40 may be either rounded as shown, or in the form of a knife edge, as shown in Fig. 4. In the latter case, the axis of pressure transmitting association with the flange 28 may be fixed. In either case such axis will be substantially fixed relative to the flange 28.

In the operation of the clutch, the spring 25 constantly urges the outer end of the lever C toward the right as viewed in Fig. 1. Fulcruming on the strut 44, the lever will tend to swing so as to move the thrust collar B against the inner ends of the levers 17 and cause the latter in turn to transmit thrust through the struts 19 to the pressure plate 15. Assuming that the clutch is in disengaged position, the strut 44 will be inclined forwardly and a trifle away from the axis of the clutch as indicated. Assuming now that the pressure on the pedal or other control member which has been holding the clutch in disengaged position, is released, the spring 25 will be allowed to draw the outer end of the lever C toward the right, causing the inner end to swing toward the left as previously indicated. Since the pressure transmitting edges 40 of the ends of the furcations 38 are substantially in the same radial plane as the fulcrum end of the strut 44 in engagement with the web 30, the movement of the inner end of the lever in clutch engaging direction will shorten the radial distance between the thrust transmitting edge 40 and the end of the strut 44. This shortening action will be compensated for by the swinging of the strut 44 around the axis of its other end, and thus the lever may swing freely without resistance at any point.

The invention has the advantage of practically completely eliminating friction in the lever linkage, the ends of the strut 44 being adapted to move with respect to their abutting surfaces with a minimum of friction, and the thrust transmitting edges 40 likewise being adapted to develop a minimum of friction with the thrust surface 41.

By locating the pressure spring means externally of the clutch per se instead of incorporating it in the clutch per se, it is possible to reduce the axial dimension of the clutch. This is an important consideration, there being an increasing demand for an axially shallow clutch.

I claim:

1. In a device including a frame part and driving and driven members, means for establishing a driving connection between said members, comprising a friction clutch, a remote source of pressure for engaging said clutch, and a collar having thrust transmitting engagement with movable parts of said clutch, an operating lever having one end connected to said source of pressure and its other end in thrust transmitting association with said collar, and a fulcrum strut interposed between said operating lever and said frame part, in pivotal association with each on axes transverse to the longitudinal axis of said lever, whereby said strut may tilt to allow said other end of the lever to maintain an axis of pressure transmitting association with said collar that is substantially fixed relative to the collar.

2. In a device including a frame part and driving and driven members, means for establishing a driving connection between said members, comprising a friction clutch, a remote source of pressure for engaging said clutch, and a collar having thrust transmitting engagement with movable parts of said clutch, an operating lever having one end connected to said source of pressure and its other end formed with a transverse edge in abutting thrust transmitting contact with a radial face of said collar, and a fulcrum strut interposed between said operating lever and said frame part, in pivotal association with each on axes parallel to said edges, whereby said strut may tilt as the lever fulcrums thereon, so as to allow said edge to maintain a non-slipping engagement with said collar.

3. In a device including a frame part and driving and driven members, means for establishing a driving connection between said members, comprising a friction clutch, a remote source of pressure for engaging said clutch, and a collar having thrust transmitting engagement with movable parts of said clutch, an operating lever having one end connected to said source of pressure and its other end formed with a semi-cylindrical surface having an axis at right angles to the longitudinal axis of the lever, said surface being in thrust transmitting contact with a radial face of said collar, and a fulcrum strut interposed between said operating lever and said frame part, in pivotal association with each on axes parallel to said surface axis, whereby said strut may tilt as the lever fulcrums, so as to allow said surface to maintain a rolling, non-sliding engagement with said collar.

4. A device as defined in claim 1, wherein said lever and frame part are each formed with a socket receiving and abutting a respective end of said strut.

5. A device as defined in claim 2, wherein said lever and frame part are each formed with a straight bottomed socket and said strut has squared ends received in said sockets and abutting the straight bottoms thereof.

6. In a device including a frame part and driving and driven members, means for establishing a driving connection between said members, comprising a friction clutch, a remote source of pressure for engaging said clutch, and a collar having thrust transmitting engagement with movable parts of said clutch, an operating lever having one end connected to said source of pressure and its other end in thrust transmitting association with said collar, spring clips embracing adjacent portions of said collar and said other end of the lever, and maintaining said edge in contact with the collar, and a fulcrum strut interposed between said operating lever and said frame part, in pivotal association with each on axes transverse to the longitudinal axis of said lever, whereby said strut may tilt to allow said other end of the lever to maintain an axis of pressure transmitting association with said collar that is fixed relative to the collar.

7. In a device including a frame part and driving and driven members, means for establishing a driving connection between said members, comprising a friction clutch, a collar having thrust transmitting engagement with movable parts of said clutch, and an operating lever for transmitting movement to said collar, said lever having an end region formed with a transverse edge in abutting thrust transmitting contact with a radial face of said collar, and a fulcrum strut interposed between said operating lever and said frame parts, in pivotal association with each on axes parallel to said edge, whereby said strut may tilt as the lever fulcrums thereon so as to allow said edge to maintain an axis of pressure transmitting association with said collar that is substantially fixed relative to the collar.

HAROLD V. REED.